K. KEELER.
PLANIMETER.
APPLICATION FILED APR. 22, 1914.
1,129,872.
Patented Mar. 2, 1915.
2 SHEETS—SHEET 1.
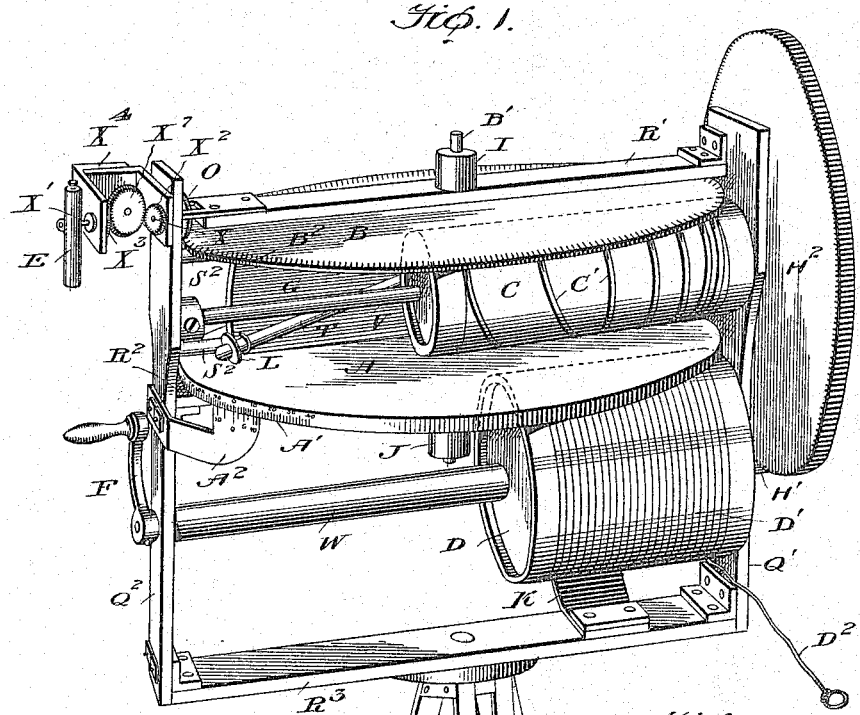
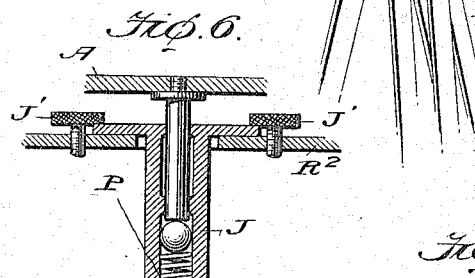
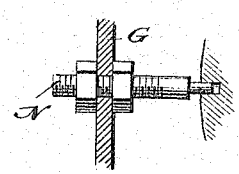
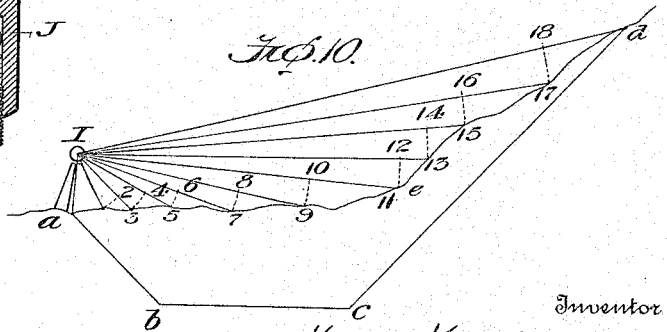
Witnesses
Wm C Dashiell
S. V. Lockwood
Inventor
Karl Keeler
By G. N. Hamlin
his Attorney K. KEELER.
PLANIMETER.
APPLICATION FILED APR. 22, 1914.
1,129,872.
Patented Mar. 2, 1915.
2 SHEETS—SHEET 2.
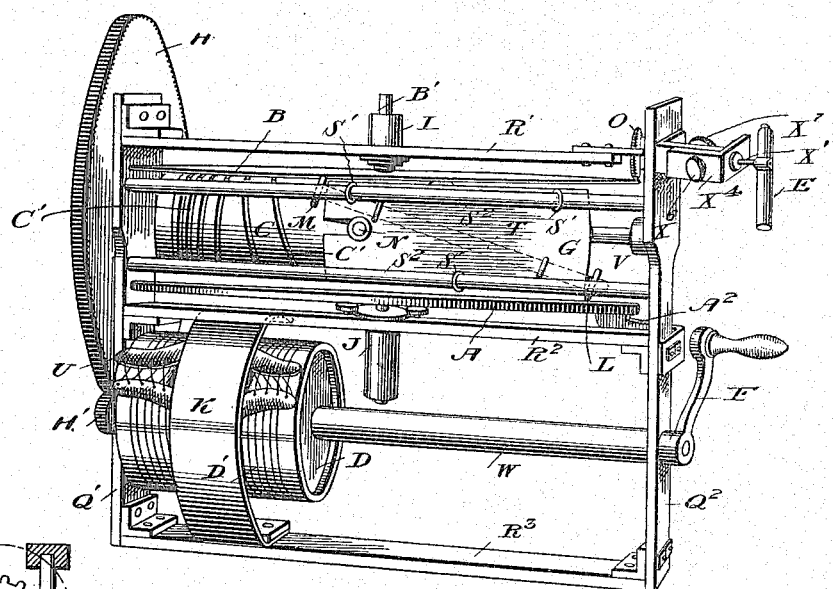
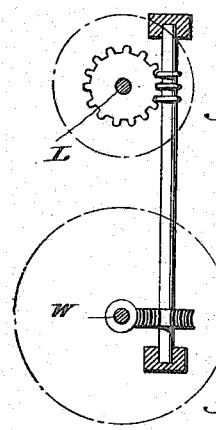
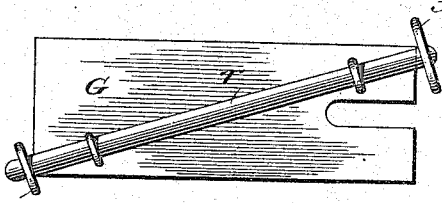
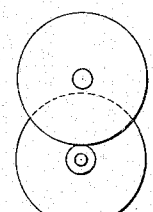
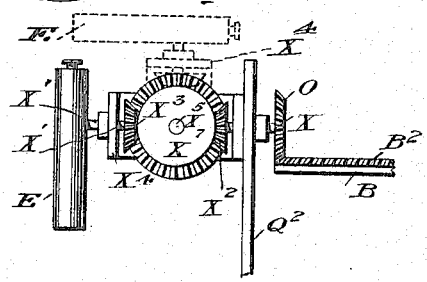
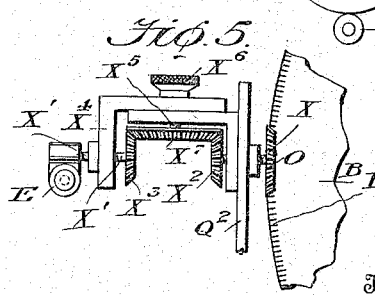
Witnesses
Wm. C. Dashiell
G. V. Lockwood
Inventor
Karl Keeler
By his Attorney

UNITED STATES PATENT OFFICE.

KARL KEELER, OF ANN ARBOR, MICHIGAN.

PLANIMETER.

1,129,872.                     Specification of Letters Patent.     Patented Mar. 2, 1915.

Application filed April 22, 1914. Serial No. 833,686.

*To all whom it may concern:*

Be it known that I, KARL KEELER, a citizen of the United States, residing at Ann Arbor, county of Washtenaw, and State of Michigan, have invented certain new and useful Improvements in Planimeters, of which the following is a specification.

This invention relates to planimeters.

The present invention, which I call a "field integraph," is based upon the well known mathematical rule that the area of a sector is directly proportional to its angle and to the square of its radius, the rule being that the area of any sector equals $\frac{1}{2}\theta r^2$, in which $\theta$ is the angle of the sector measured in radians and $r$ the radius of the sector.

The present invention has for its object the provision of a portable instrument of simple construction, embodying a novel principle of operation, which can be taken into the field where a given area is to be calculated and utilized to automatically calculate and indicate the area of a surface lying in any plane, without requiring computation.

The invention embodies an extensible device, such as a tape, wire, or cord, which can be drawn out to any desired extent, a sighting device by which the end of the drawn out tape, cord or wire or any predetermined part thereof may be observed, and an automatically acting indicating means coöperating with the cord, tape or wire and the sighting device, so that the angle traversed by the sighting device in taking the observation, combined with the length or distance to which the cord, tape or wire is extended, determines the operation of the means coöperating therewith and as a result the correct indication of area is either directly shown or indicated vernier fashion.

In accordance with the requirements of the statute, I have shown in the drawings and hereinafter explained an embodiment of the invention which is adapted to carry out the principle thereof, but I am aware that changes of construction can be resorted to in carrying out the principle of the invention and I do not, therefore, restrict myself to the details of the mechanism set forth, but on the contrary, claim all variations within the spirit and scope of the invention.

In the accompanying drawings: Figure 1 is a perspective of the complete invention; Fig. 2, a similar view looking toward the opposite side of the instrument; Fig. 3, a detail side elevation of the carriage and shaft carried thereby; Figs. 4 and 5, details of the sight and its connections; Fig. 6, a detail of the step bearing for the lower disk; Fig. 7, a detail of the tracer pin; Figs. 8 and 9, details of a modified gearing which may be used; and Fig. 10, a diagrammatic view illustrating the use of the invention.

The instrument is adapted to be pivotally mounted on a tripod 1 in any suitable manner and the operative parts are carried by a frame consisting mainly of a horizontal member $R_3$ and upright members $Q_1 Q_2$ connected by cross frame members $R_1 R_2$. Journaled in the frame members $Q_1 Q_2$ is a shaft W having a drum D and a pinion $H_1$, as also an operating crank or handle F secured thereto. Wound on the drum D is a tape or wire $D_1$ which has one end connected thereto and its other end free as at $D_2$ which is adapted to be drawn out to any desired point. Secured to the frame member $R_3$ is a spring K which carries a cross bar and pad U that is pressed against the wire $D_1$ by the action of the spring, thus preventing any looseness of the wire on the drum D and also preventing it from unreeling too fast. The pad acts as a brake to afford a necessary degree of friction for the above purpose. Journaled in the frame members $Q_1 Q_2$ is a shaft V to which is secured a cylindrical cam C having a cam groove $C_1$. Secured to the shaft V is a reducing gear $H_2$ which is in mesh with the pinion $H_1$ and by which a number of revolutions of the shaft W and drum D, due to the extension of the wire or tape $D_1$, are required to cause the gear $H_2$, shaft V and cam C to make one complete revolution. Connected to the frame members $Q_1 Q_2$ are guide rods $S_2$ to which a carriage G is slidably connected by the supports $S_1$. The carriage G has a pin N which is secured thereto but may be adjusted lengthwise thereof or perpendicular thereto by the provision of a slot and clamping means for the pin (Fig. 7). Carried by the bars $R_1 R_2$ are bearings I and J, respectively, the latter having an adjustable step bearing P (Fig. 6). Bearing J is adjustable lengthwise or crosswise of bar $R_2$ and secured, where adjusted, by set screws $J'$. Journaled in the bearings I and J by the shafts $B_1$ and $A_1$ are disks B and A, respectively. Disk B is provided with a circular rack $B_2$.

Disk A is graduated on its edge, as at A', for reading, from a vernier $A^2$, of the area indicated.

Referring to Figs. 4 and 5, a shaft X is journaled in the frame-piece $Q_2$ and carries a pinion O which meshes with the rack $B_2$ (Fig. 4). Secured to the shaft X' is a sight E which may be a tube with cross wires, or an open sight having cross wires may be substituted. Shafts X, X', have pinions $X^2$, $X^3$. Shaft X' and the sight E are carried by a bracket $X^4$ which is pivotally mounted on a stub shaft $X^5$ having thumb-clamping nut $X^6$. An idle gear $X^7$ meshes with pinions $X^2$, $X^3$. On loosening the nut $X^6$, the bracket $X^4$ swings in a vertical plane and the sight E can then be swung on its shaft X' in any plane in which it may be positioned.

Carried by suitable bearings on the carriage G is an inclined shaft T which carries at its upper end a friction wheel M and at its lower end a friction wheel L (Fig. 3). These wheels are constantly in frictional contact with the disks B and A, respectively. The point or pin N is received in the cam groove $C_1$ of cam C and consequently, the rotation of that cam shifts the carriage G on its guides $S_2$.

Among the changes which might be resorted to in carrying out my invention, the drum D may be placed above the disk B; in substitution for the pinion $H_1$ and gear $H_2$, there may be provided a series of gears as shown in Fig. 8, or a worm gearing as in Fig. 9. These changes are not to be considered as the only ones which I contemplate, but merely as illustrative, as I lay claim to all modifications adapted to carry out the objects and to embody the principle of the invention.

In using the instrument to determine the area of a piece of ground, for instance, it will be set up at a suitable point. One operator will stand at the instrument and the other will extend or pull out the wire D, to trace the outline or boundary of the area to be measured by following such outline or boundary with the end $D_2$ or with any other predetermined part of the wire or tape. The wire or tape must extend tautly in a straight line from its end $D_2$ to the instrument. The operator at the instrument constantly observes the end $D_2$ through the sight E as the other operator traces the boundary of the area. Resistance to the pulling out of the wire may be had by checking its unreeling by the handle F, but such handle is primarily intended for winding up the wire on the drum D.

When the boundary or outline of the surface being measured has been traced by the end $D_2$, the area of the surface may be read from the vernier and the graduations on the disk A, which indication is brought about as follows: As the tape or wire $D_1$ is unwound from drum D, it causes revolution of shaft W, which in turn, through gears $H_1$ $H_2$, (or other gearing used) causes revolution of cam C. The revolution of cam C, by reason of the reception of point N in groove $C_1$, causes the carriage G to shift parallel to shaft V. Now, the operator at the instrument is moving the sight E as he follows with his eye the end $D_2$ on the end of the wire $D_1$ and as the sight E is moved, the spindle X is turned, which causes turning of the pinion O and thereby causes turning of the disk B. The revolution of the disk B or any movement thereof is communicated to the shaft T by the friction wheel M and by the friction wheel L to the disk A. It will be seen, therefore, that the unwinding of the tape directly results in the shifting of the carriage G and the position of the friction wheels L and M in relation to the disks A and B, whereby the ratio of the radius of each disk to the radius of its friction wheel is changed according as the tape or wire is let out or taken up. Now, the angle through which the disk A revolves is dependent both on the position of the carriage G and the angle through which the disk B is revolved by the movement of the sight E. Consequently, the angle through which the disk A revolves is dependent both on the length of tape or wire $D_1$ unwound and the angle through which the sight E is turned. The length to which the tape $D_1$ is pulled out and the angle to which the sight E is turned both depend upon the distance of the boundary or outline of the surface from the instrument. Given, therefore, the angle and the radius, the mechanism automatically computes the area which is directly indicated on the disk A in reference to any fixed point on the instrument, or vernier fashion.

Reference is to be had to Fig. 10 for a diagrammatic showing of the use of the instrument in computing an area. In this figure there is represented the cross-section of a proposed canal or railroad cut or excavation, where $a\ e\ d$ represents the surface of the ground; $a\ b$ the left bank; $b\ c$ the bottom; and $c\ d$ the right bank of the cut. It being desired to ascertain the number of square yards of area in $a\ b\ c\ d\ e$, it will be understood that the said area plus the area $a\ e\ d$ I equals the area $a\ b\ c\ d$ I. Now, the area $a\ b\ c\ d$ I is bounded by known straight lines and is, therefore, readily calculable. Consequently, if the area $a\ e\ d$ I is known, it may be subtracted from the readily calculated total area $a\ b\ c\ d$ I and the result will be the desired area $a\ b\ c\ d\ e$. Now, the present invention being adapted to determine the area $a\ e\ d$ I, the desired area $a\ b\ c\ d\ e$ can be readily obtained.

Let I represent the present invention and the light lines radiating from I the various positions of the extensible wire or tape $D_1$. The light lines, together with the dotted arcs, form sectors, and the area of each sector equals $\frac{1}{2}\theta r^2$ in which $\theta$ equals its angle in radians, and $r^2$ equals the square of its radius. Now, let I$a$ represent the first position of the wire or tape and $I_2$ its second position after being swung through the angle $\theta$. The sight $e$ is at all times kept pointing to the end $D_2$ of the tape or wire and hence, the sight will also be swung through the same angle $\theta$; further, the area of the sector I$a^2$ equals $\frac{1}{2}\theta r^2$, and when the wire or tape has reached its second position, $I_2$, the area of the sectorI$a^2$ will be indicated at the vernier $A^2$ of the instrument. Let the wire end be extended along $I_2$ until it touches the ground at 3 and then swung to position $I_4$; at this point the area indicated by the instrument will equal the sum of the areas of the two sectors I$a^2$ and $I^{34}$. This series of operations is carried on until the wire or tape finaly reaches the position $I_{18}$; at this point the area indicated by the instrument will equal the sum of the areas of all the sectors, which sum is approximately equal to the area $a\ e\ d$ I. Now, assuming the number of light lines to increase, the number of sectors would also increase, and the size of the angles of the sectors would decrease, and the sum of the areas of the sectors would finally equal the area $a\ e\ d$ I. It will be seen, therefore, that if the end $D_2$ of the wire or tape is made to follow the outline of the area and the sight made to point to the end of the wire, at all times, the area indicated by the instrument is the area swept over by the wire.

The sight is arranged to turn in any plane by the means shown in Figs. 4 and 5 and the swinging of the entire instrument on its tripod which enables calculation of a surface lying in any plane to be made.

Having thus described my invention, what I claim as new and desire to secure by Letters Patent, is:

1. In a planimeter, the combination with a wire or tape, of means whereon the tape is adapted to wind and unwind, a movable sight for observing the drawn-out part of said wire or tape, and indicating means coöperating with the sight and the wire or tape winding means whose action is controlled thereby and which is adapted to automatically indicate area by the relationship of the effective drawn-out length of the wire or tape to the angle traversed by the sight in observing said effective length of the wire or tape.

2. In a planimeter, the combination with a drum and a wire or tape wound thereon and adapted to be drawn off therefrom, of a swinging sight adapted for observing the drawn out part of the wire or tape, and means coöperating with said sight and said drum adapted to automatically indicate area by the relationship of the effective drawn out length of the wire or tape to the angle traversed by the sight in observing said effective length of the wire or tape.

3. In a planimeter, the combination with an extensible device, of a movable sight for observing said extensible device, a carriage adapted to be shifted by the movement of the extensible device, an indicating wheel, a rotatable member carried by the carriage and adapted to coöperate with said indicating wheel, and means controlled by the movement of the sight adapted for rotating said rotatable member.

4. In a planimeter, the combination with an extensible device, of a movable sight for observing said extensible device, a carriage adapted to be shifted by the movement of the extensible device, an indicating wheel, a rotatable member carried by the carriage and adapted to coöperate with said indicating wheel, a wheel with which the movable sight coöperates, and an operative connection between said last-named wheel and the rotatable member.

5. In a planimeter, the combination with a drum, of a wire or tape wound thereon and adapted to be drawn out therefrom, a cam operated by said drum, a shiftable carriage having means coöperating with the cam whereby the carriage is shifted by the movement of said cam, a shaft carried by said carriage, indicating and transmitting disks, wheels carried by the shaft which engage the said disks, said carriage being adapted to position the wheels differently at different times in relation to said disks by the action of the cam aforesaid, a movable sight adapted for observing a predetermined point on the unreeled part of the wire or tape, and means coöperating with the sight and with the transmitting disk, whereby the length of wire or tape unreeled from the drum and the angle traversed by the sight conjointly determine the indication on the indicating disk.

In testimony whereof. I hereunto affix my signature in presence of two witnesses.

KARL KEELER.

Witnesses:
C. E. BARTHELL,
Mrs. KARL KEELER.